United States Patent [19]

Cox et al.

[11] Patent Number: 5,349,643
[45] Date of Patent: Sep. 20, 1994

[54] SYSTEM AND METHOD FOR SECURE INITIAL PROGRAM LOAD FOR DISKLESS WORKSTATIONS

[75] Inventors: James O. Cox; James M. Mott, both of Austin, Tex.

[73] Assignee: International Business Machines Corporation, Armonk, N.Y.

[21] Appl. No.: 58,842

[22] Filed: May 10, 1993

[51] Int. Cl.$^5$ .............................................. H04L 9/12
[52] U.S. Cl. ........................................ 380/25; 380/4; 380/49
[58] Field of Search ................................ 380/4, 25, 49; 340/825.34

[56] References Cited

U.S. PATENT DOCUMENTS

| | | | |
|---|---|---|---|
| 3,996,449 | 12/1976 | Attanasio et al. | 340/825.34 |
| 4,799,258 | 1/1989 | Davies | 380/25 |
| 4,941,175 | 7/1990 | Enescu et al. | 380/4 |
| 4,958,278 | 9/1990 | Meguro . | |
| 4,969,188 | 11/1990 | Schobi | 380/25 |
| 4,984,272 | 1/1991 | McIlroy et al. | 380/25 |
| 5,023,907 | 6/1991 | Johnson et al. | 380/4 |
| 5,032,979 | 7/1991 | Hecht et al. . | |
| 5,053,947 | 10/1991 | Heibel et al. . | |
| 5,056,140 | 10/1991 | Kimbell | 380/25 |
| 5,067,154 | 11/1991 | Hosobuchi et al. | 380/25 |
| 5,210,795 | 5/1993 | Lipner et al. | 380/25 |

OTHER PUBLICATIONS

"Auto Initial Program Load Function", IBM Technical Disclosure Bulletin, vol. 32, No. 2, Jul. 1989, pp. 115–116.

*Primary Examiner*—Salvatore Cangialosi
*Attorney, Agent, or Firm*—Robert M. Carwell

[57] ABSTRACT

A client workstation generates a network request for an initial program load. The request is serviced by a server which preferably includes in the reply to the client the addresses of an authentication server (AS), client, and a secure initial program load server (SECIPL). The client then requests an SECIPL service ticket from the AS, also sending a common identifier known to the AS and the client, preferably stored in the client ROM. This identifier is utilized by the AS to validate the ticket request as originating from a bona fide client, whereupon the ticket is provided by the AS to the client, the SECIPL service ticket is then presented by the client to the SECIPL server which then authenticates that the ticket is bona fide and was received by the client from the AS. The SECIPL then provides a secure kernel to the client, either encrypted with a key known to the SECIPL and client, or otherwise secured by a cryptographic checksum utilizing a key known to the client and the SECIPL. In this manner, the client workstation is thereby assured that an authenticated boot image has been received through potentially non-secure communication links.

24 Claims, 3 Drawing Sheets

SYSTEM AND METHOD FOR SECURE INITIAL PROGRAM LOAD FOR DISKLESS WORKSTATIONS

FIELD OF THE INVENTION

This invention relates to computer networks in general and, more particularly, concerns systems and methods for ensuring a secure boot for a diskless workstation.

BACKGROUND OF THE INVENTION

Computer networks are quite prevalent in the art now which provide for one or more server machines interconnected in a network fashion to multiple client machines generally of lesser capability. There are numerous benefits to this arrangement. For example unnecessary replication of more expensive hardware at the clients is avoided which might otherwise be shared by multiple clients if located at a central repository.

In such networks, it is common to provide the client machines in the form of medialess or diskless workstations. These machines have no substantial (and generally more expensive) non-volatile mass storage devices such as DASD or the like. Rather, they rely upon mass storage devices such as at servers at other locations in the network to store the necessary code and data which must be available to the client machines to perform their functions. In such arrangements, it is conventional for the server(s) to deliver the code and data over the network connection to the particular client at appropriate times. In this manner, the client need only have present in its real memory at any given time only the information stored in the mass storage devices at the server(s) necessary to perform a function at that time. The need is thereby avoided of having mass storage devices at each client containing information which remains in an unused state for long periods of time and which adds to the cost of the network.

Representative such client-server systems may be seen described in U.S. Pat. No. 5,056,140 entitled "Communication Security Accessing System and Process" and U.S. Pat. No. 4,958,278 entitled "Method for Loading Data or Program to a Plurality of Terminal Stations", for example.

Several problems have come about as a result of the growth of these computer network systems. Not the least of these is the serious problem of unauthorized access to the systems which has been reported with alarming increased frequency. With the proliferation of large multi-user computer systems with enormous banks of extremely valuable data, techniques were highly sought for enhancing the security of these networks.

Accordingly, numerous schemes have developed over the years including encryption, passwords, physical security devices such as keyed switches, and so forth in an effort to deter the rising rates of unauthorized access. Several subtle security exposures arise from the characteristics of the diskless workstation in seeking to secure the previously described network systems which employ diskless workstations. As but one example, in order for such a workstation to become operative upon power up, it is necessary for the workstation to obtain the kernel operating system code from somewhere else in the network. This is because the operating system is not resident at the workstation itself (for reasons previously described that the non-volatile storage necessary to store the operating system at the workstation is undesirable and cost-prohibitive.) One problem with this, however, is that the industry standard boot protocol does not provide for certification of this kernel code delivered from the network to the booting diskless workstation in any way.

The delivery of non-certified boot code to a workstation upon booting is fraught with numerous problems which have beset the industry, particularly in the more security-sensitive areas in which computer networks have been established. As but one example, one of the computers in the network could be configured to provide a kernel to a diskless system when it boots. It may be assumed, for purposes of illustration, that this kernel-providing system may be faster at providing such kernel code than the "officially" designated kernel source machine for the network. In such a case, upon booting of the diskless workstation, the non-certified kernel from the computer will be loaded by the workstations which then, in response, might very typically be asked to supply a password. Upon the password being provided by the operator at the workstation, this password would be received by the computer providing the bogus boot kernel code requested by the workstation. Later, the unauthorized individual, who has thereby surreptitiously obtained the valid password from the workstation operator, could sign onto the network system, utilize the thus-obtained valid password, and unauthorizedly enter the entire computer network.

In an effort to solve the foregoing problems, numerous solutions were attempted resulting in customer requirements for diskless stations, networks and modifications which were not appropriate or cost-effective for systems not requiring such security. This resulted in manufacturing expenses and costs associated with providing two types of systems.

Accordingly, systems and methods were needed which could provide assurances that a diskless workstation was obtaining a certified kernel upon booting, and which could further ensure the kernel server that the workstation machine requesting the kernel was an authorized workstation.

It was accordingly an object of the invention to provide an improved boot architecture.

Yet another object of the invention is thus to provide an improved communication security system for diskless workstations which rejects connection to an unauthorized user terminal.

Still another object was to provide for a boot architecture for secure initial program load (IPL) for diskless workstations which nevertheless provided the ability to offer one standard diskless station with only minimal modifications being required for the addition of a secure IPL feature.

These and other objects and features are provided by the invention, a fuller understanding of which may be obtained with reference to the following description taken in connection with the accompanying drawings, wherein:

SUMMARY OF THE INVENTION

A client workstation generates a network request for initial load information. The request is serviced by a server which preferably includes in the reply to the client the addresses of an authentication server (AS), client, and a secure initial program load server (SECIPL). Additionally, the reply will typically include the client realm, client principal name and time of day, although the latter two may optionally be provided other servers whose names are provided in the bootp response or otherwise available to the client in hardware. The client then requests an SECIPL service ticket from the AS, also sending a common identifier known to the AS and the client, preferably stored in the client ROM. This identifier may be the principal name of the SECIPL utilized by the AS to validate the ticket request as originating from a bona fide client. The ticket is then provided by the AS to the client after the AS authenticates the client by means of checking the common identifier. The SECIPL service ticket thereby received by the client from the AS is then presented by the client to the SECIPL server. The SECIPL server then authenticates that the ticket provided by the client to the SECIPL is bona fide and was received by the client from the AS, in that the SECIPL has knowledge of the content of an authentic ticket originating from the AS. The SECIPL then provides a secure kernel to the client, either encrypted with a key known to the SECIPL and client, or otherwise secured by a cryptographic checksum utilizing a key known to the client and the SECIPL. In this manner, the client workstation is thereby assured that an authenticated boot image has been received through potentially non-secure communication.

IN THE DRAWINGS

DETAILED DESCRIPTION OF THE PREFERRED EMBODIMENT

Figure 1:
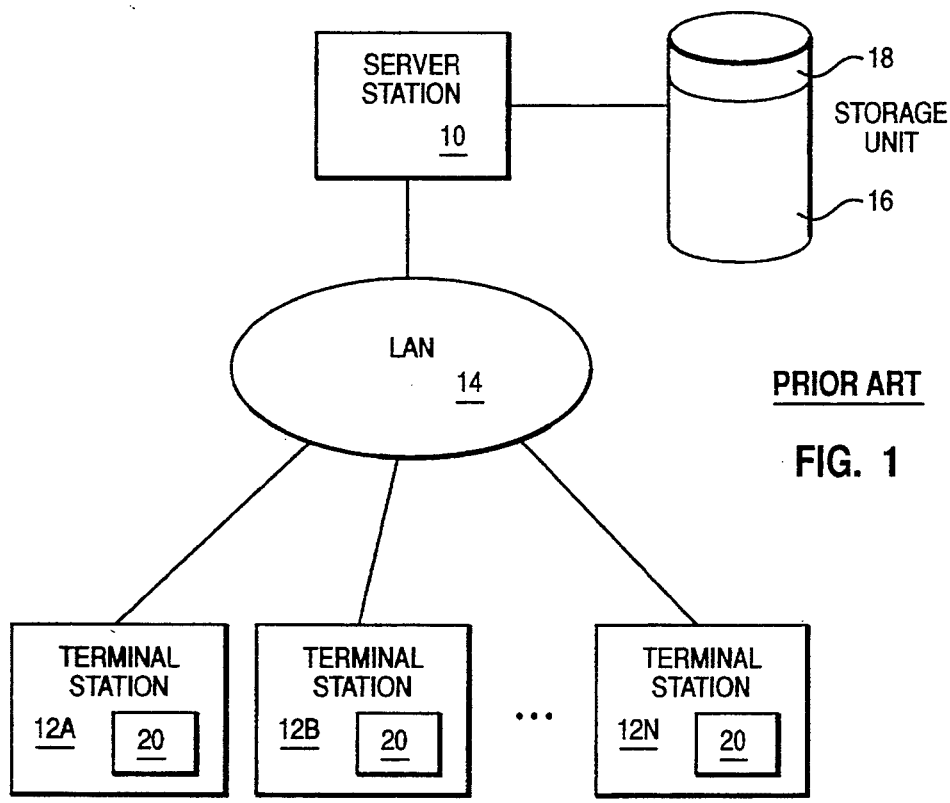
FIG. 1 is a functional diagram of a conventional computer client-server network utilizing diskless workstations.

Referring first to FIG. 1, a conventional computer network is shown typically comprised of a server station 10 ("server"), and a plurality of terminal stations or workstations also known as "clients" 12A–12N interconnected by means of a local area network or LAN 14. The server station 10 includes a mass storage unit 16 known as a direct access storage device (DASD).

One of the desirable characteristics of the client-server type networks shown in FIG. 1 stems from the fact that in such networks it may be common to have large numbers of such workstations distributed throughout a work environment. Accordingly it is highly desirable to keep the cost of such workstations low and avoid unnecessary duplication of hardware which might better and more efficiently be implemented at a central location such as at the server. One such opportunity arises from the fact that there is common code and data which typically must be utilized by all of the workstations 12A–12N upon initial boot up procedures as well as common operating system code enabling the workstations to perform their normal work functions.

This initial program load (IPL) and kernel code 18 may thus advantageously be stored in the DASD 16 and then accessed as necessary in a boot sequence by the workstations 12A–12N. These workstations will in fact contain more limited storage 20 for storing the necessary IPL and kernel code 18 which is downloaded through the server 10 and the LAN 14 when the particular workstation is booted. This storage 20 is typically in the form of volatile random access memory which is relatively inexpensive. It however has the unfortunate characteristic that upon power down the data stored therein is destroyed, thus requiring repeated download of the code 18 from the server 10 upon each such instance of booting of a workstation. The workstations may, in some instances however, have non-volatile storage and the invention is thus not intended to be limited only to diskless workstations.

It will be noted in passing that these workstations also typically contain a small amount of non-volatile storage capacity normally in the form of read only memory (ROM). This ROM contains the essential code performing the very limited function of initiating the download procedure of the more extensive boot IPL and kernel operating system code which will thereafter be used by the particular workstation in performing its normal functions.

Turning now to the diagram of the network shown in FIG. 2, the features of the present invention will now be described providing for delivery of a secure initial program load of this code 18 for such workstations. First the components of FIG. 2 and a high level explanation of their functions will be described with reference to FIG. 2 followed by a detailed description of the sequence of operation of the invention with reference to the flow diagram of FIG. 3.

Figure 2:
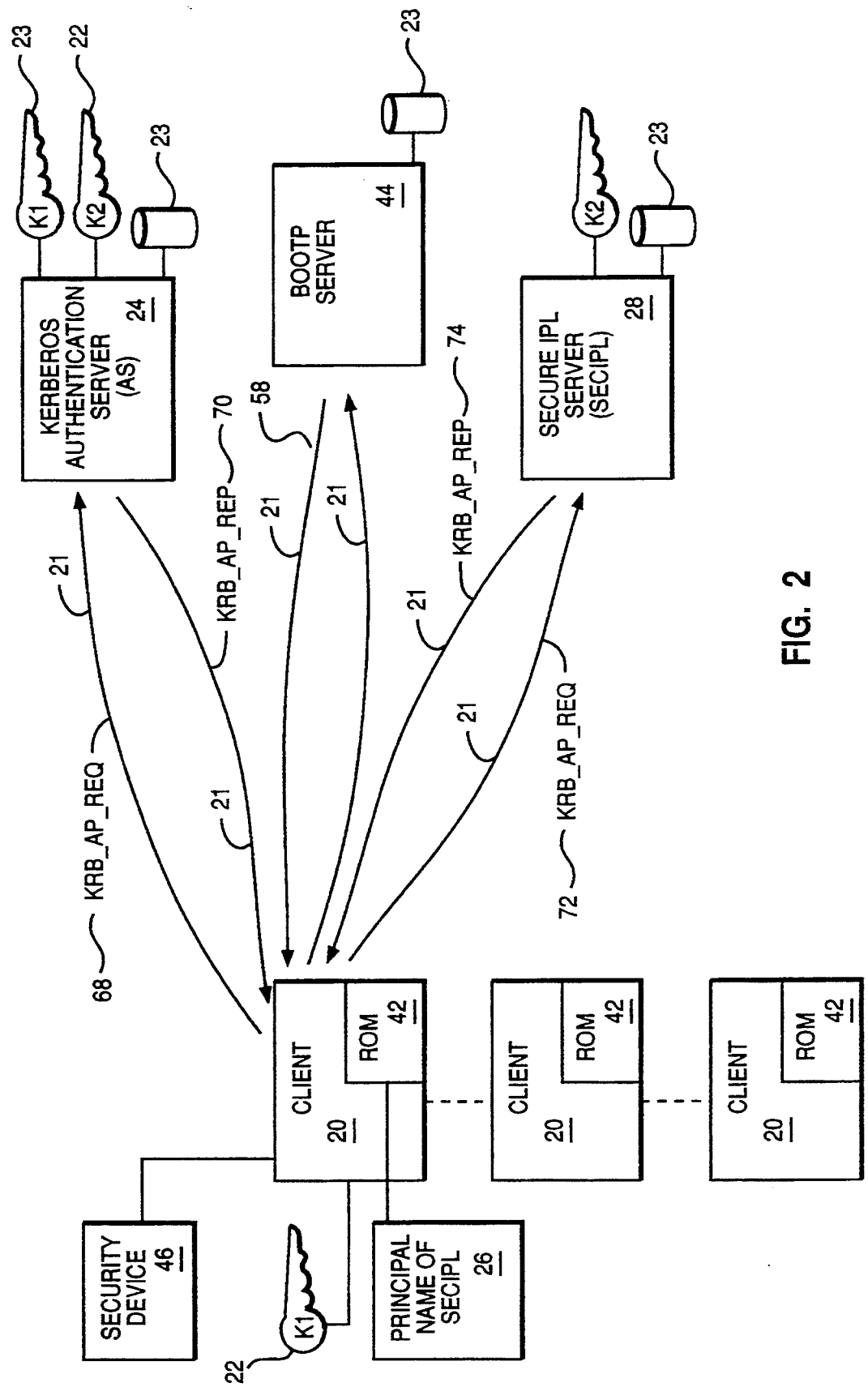
FIG. 2 is a more detailed functional block diagram of a networking system of FIG. 1 utilizing the secure IPL process in accordance with the invention.

There is shown in FIG. 2 a plurality of client workstations 20 similar to the workstations 12A–12N of FIG. 1. Additionally, the system of FIG. 2 typically includes a secure IPL server 28, which serves the purpose of providing the program images required for IPL by the client workstations 20.

Additionally, the system of FIG. 2 will typically include an authentication server such as Kerberos server 24, which serves the purpose of ensuring that upon initial contact with the AS, each workstation client 20 is verified to be genuine and further responsible for providing authentication keys for continued operation. Although the embodiment depicted employs a Kerberos authentication system well known in the art, the invention is not intended to be limited to such a particular implementation of a security system.

Also, the system of FIG. 2 will desirably include a bootp server 44 which serves the function of responding to client bootp requests to provide information which allows the clients to continue with the boot process. The foregoing generally described functional elements of the system FIG. 2, it will be appreciated, may be implemented on multiple physical machines or on a single machine as the application dictates.

The workstations 20 function through a LAN 21 functionally represented by the arrows in connection with various servers to be hereinafter described and mass storage 23 broadly in a manner similar to that of FIG. 1. However, with respect to the system and method of the invention, the client workstations 20 access some minimal information utilized to implement the desired authentication service of the invention whereby the kernel and client boot sequence may thereby be certified or authenticated. This information shown in FIGS. 3A and 3B includes a first service key 22 for each workstation to be hereinafter described known only to the client workstations 20 and the Kerberos Authentication Server (AS) 24. Further such information includes the principal name 26 of the secure kernel IPL service (SECIPL) 28 and the client's REALM name 30. A realm name is a concept of security systems whereby a client is assigned a realm name utilized by a security server 24. The client to instruct the client 20 as to which security server 24 the client is to communicate with to validate information. Still further such information desirably includes the current time of day 34 within a REALM-specific skew value which may be provided by a bootp server 44, the principal name 32 of the client 20 (also provided by the bootp server 44), the IP address 36 of the client 20, the IP address 38 of the authentication server 24, and the IP address 40 of the SECIPL server 28.

It is desirable for the ROM 42 of each client 20 to contain the previously noted principal name 26 of the SECIPL server or service 28. The client 20 as previously noted is also responsible for knowing the secret first key 22 to be hereinafter described. The BOOTP server 44 is provided which may provide the aforementioned principal name of the client itself, 32, and the current time of day 34. The BOOTP server 44 will desirably also provide the just-described client's realm name 30, and the IP addresses 36-40 of the clients, the AS server and the SECIPL, respectively.

The confidential first key 22 is preferably only known by the client workstation's 20 and the AS server 24 (as well as, of course, a system network administrator, security personnel, or the like, etc.). Regarding implementation of the key 22 on the client side of the network, in one implementation an external security device 46 such as a keyed lock may be physically attached to the client workstation's 20 in order to provide the key 22. It will be noted that the key 22 utilized by the client workstation's 20 preferably will not be used anywhere else. Such a key 22 is to be distinguished from a key typically utilized by an individual signing onto a workstation 20 which is utilized to validate the user to the server 24. It will further be noted that the key 22 in the preferred implementation will be utilized only once, whereby such a key 22 will be employed to request from the AS server 24 a ticket 48 to the SECIPL service 28. Conventionally the AS server 24 would normally provide a ticket to a Ticket Granting Service (TGS) which itself performs the action function of providing a key 22.

As noted before, the principal name 26 of the SECIPL service 28 in a preferred embodiment is to be hard-coded into the ROM 42 of each client workstation 20. This is to prevent an attack on the security of the network described hereinbefore in the Background of the Invention wherein an export of a valid service may create a counterfeit BOOTP server which could respond more quickly than the bonafide real BOOTP service 44. This counterfeit BOOTP server could thereby present the IP address and service name of a counterfeit IPL server. The client 20 in such an attempt at a security breach, would authenticate normally, and the resulting bits received from the counterfeit SECIPL server could thereby be utilized to attack the security of the network effecting a serious security breach.

Two items of optional information in the implementation being described with reference to FIG. 3 presented by the BOOTP server 44 to the client 20 must be derived by the workstation 20 if they are not provided in the BOOTP response. The principal name 32 of the client 20 may be derived by querying a local nameserver, where the IP address of the nameserver was provided in the BOOTP response. The current time of day 34, in like manner may be acquired by querying a local time server where the IP address of the timeserver could be provided also in the BOOTP response. Both or either of these pieces of information may be cached locally or derived in some implementation-specific way as desired. The other four items of information (namely the IP addresses 36-40 and the name 30 of the client 20 realm) will desirably be presented in the BOOTP response to the client. The realm name 30 of the client 20 in one implementation may be up to 128 bytes long, it further being preferred that the BOOTP response for the desired secure IPL include the realm name 30 of the client 20.

Figure 3B:
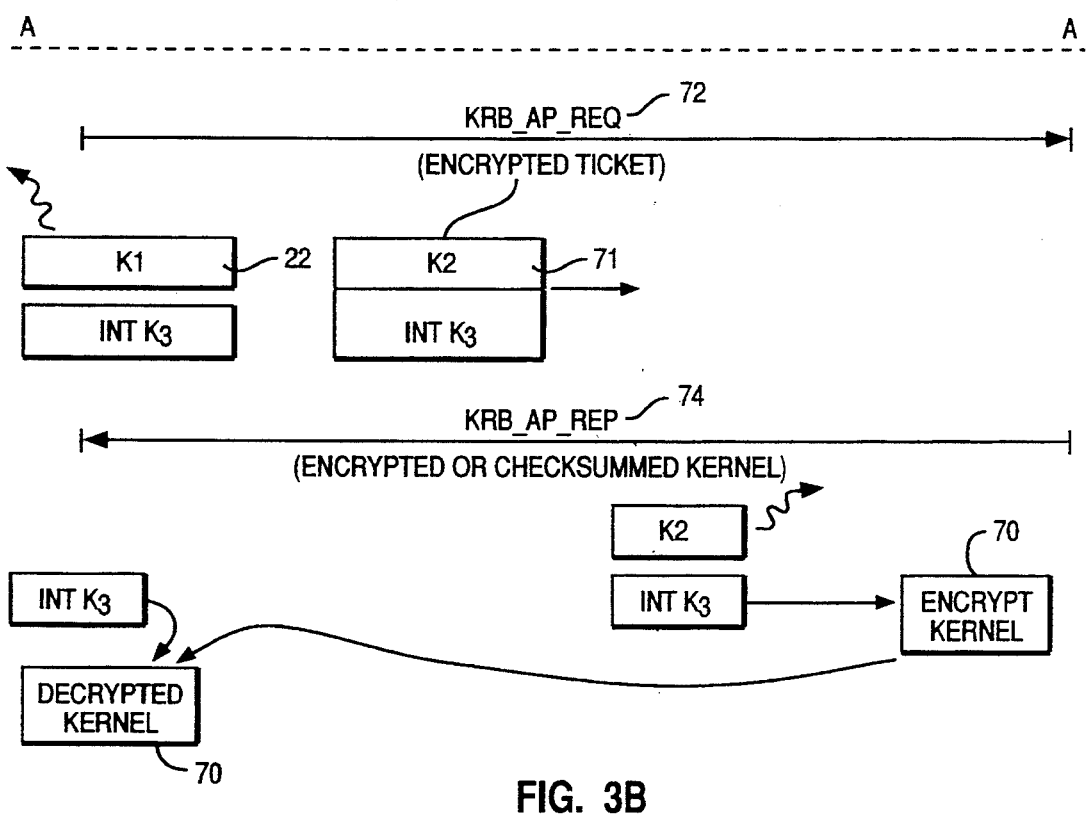
FIGS. 3A and 3B is a flow diagram representing the sequence of process steps in accordance with the invention providing a secure IPL for diskless workstations in a computer networking environment.
Figure 3A:
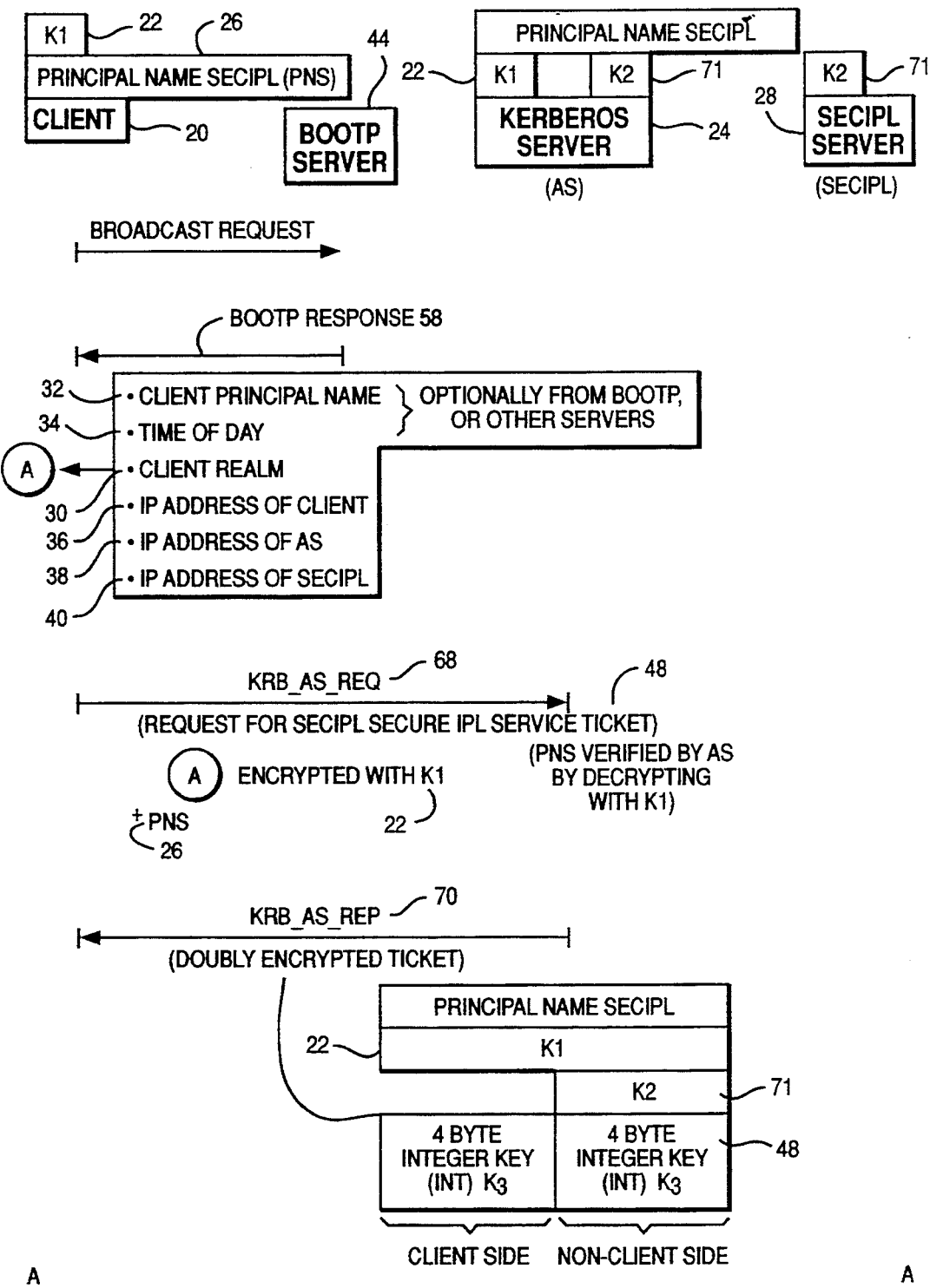

A more detailed description will now be provided with reference to FIGS. 3A and 3B of the formats of the Kerberos packets that should be understood by the BOOTP client 20. In a preferred implementation there are four basic packets 66 which are exchanged by the client 20 as follows:

KRB_AS_REQ, 68, is a packet sent from the client 20 to the Kerberos server 24 to obtain a ticket 48 to later present to the SECIPL service 28.

KRB_AS_REP, 70, is a packet response from the Kerberos server 24 to the KRB_AS_REQ request in packet 68 and will contain the ticket 48 for the SECIPL service 28.

KRB_AP_REQ, 72, is a packet sent from a particular client 20 to the SECIPL service 28 to request an IPL kernel 70, which also contains the shared second key 71 to be used for optional kernel encryption or cryptographic checksum.

KRB_AP_REP, 74, is a packet containing a response from the SECIPL server 28 to the KRB_AP_REQ request 72. There are provided in this packet the fields 75 and 73 which are part of the request packet and would preferably be encrypted, thereby requiring decryption by the client 20 utilizing the shared second key 71 to authenticate the SECIPL server 28.

The KRB_AS_REQ and KRB_AS_REP packets, 68 and 70, respectively, will be sent as standalone packets to and from the Kerberos server 24 identified in the BOOTP response 58. The KRB_AS_REP packet 70 contents from the AS 24 will be checked with the first key 22 by client 20 to verify the Kerberos server or 24 AS is a valid one. It should be apparent that only a valid Kerberos server 24 will contain the unique secret key 22 of a particular client workstation 20. A ticket field 48 from the KRB_AS_REP packet 70 will be placed in the KRB_AP_REQ packet 72 to present to the SECIPL server 28. The whole KRB_AP_REQ packet 72 will be preferably included in a TFTP RRQ packet directly behind the SECIPL option. (A modified TFTPB daemon is provided which will return a KRB_AP_REP packet 74 before starting the desired file transfer).

Turning for a moment to a more detailed description of the SECIPL server 28, in a preferred implementation this SECIPL server 28 is a modified TFTPD server, such modification essentially being that the server supports services for selection of IPL images based on supplied criteria from the client and that this modified server will return the KRB_AP_REP packet prior to beginning file transfer to the client. The server 28 may preferably be included as part of the BOOTP server 44, or alternatively may be stand alone. The SECIPL server 28 will accept the hereinbefore described RRQ packet along with information on the state of the key switch of the client, client processor type, main memory size, and the client's principal name 32. The server 28 will then select a kernel based upon this information to return to the client 20. The kernel data itself may desirably be encrypted with the shared session key 48 to be further described or the service may append a cryptographic checksum at the end of the kernel transfer.

Still referring to FIGS. 3A and 3B, the KRB_AS_REP doubly-encrypted ticket will contain the ticket field 48 encrypted by the key K1, reference numeral 22, as well as the key K2, 71, the first key 1 being known by the client and AS and key K2 being known by the AS and SECIPL. When the doubly encrypted ticket is received by the client 20, the principal name SECIPL and K1 may be stripped off leaving a four byte integer key on the client side. Similarly, the four byte integer key on the non client side encrypted with the K2 key may then be transmitted as the KRB_AP_REQ encrypted packet to the SECIPL server. Because the K2 key is known by the SECIPL server as well as the Kerberos server from which it originated in the KRB_AS_REP ticket, the SECIPL may strip this K2 key off leaving the integer key known by both the client and the SECIPL. As shown at the bottom of FIG. 3B, this four byte integer key may then be utilized to encrypt the kernel 70 whereupon the encrypted kernel may be transmitted back to the client 20 as KRB_AP_REP 74. Upon receipt by the client 20, this four byte integer key may be utilized by the client to decrypt the kernel 70 to provide the desired authenticated initial program load code. In the alternative, the kernel, upon transmission from the SECIPL, may be checksummed with the checksum encoded by the integer. Whereas this would permit reads of the kernel since it would be unencrypted when sent from the SECIPL to the client, the client could nevertheless by decrypting the checksum transmitted from the SECIPL to the client, verify that although the kernel may have been read by others it was not tampered with inasmuch as the checksum remained intact.

Further preferred details of implementation of the foregoing will now be described. One problem which is desired to be solved in any implementation of a secure boot of a diskless workstation is to provide an architecture whereby minimal modifications to existing systems may be made to provide this feature. A particularly desirable manner of implementing support for secure IPL in a diskless workstation in accordance with the invention is to provide a boot-time hook that searches I/O for IPL code. If such code is found, it is copied into real memory of the client and executed. The foregoing is a typical manner in which personal computers work for example. If the diskless machine or workstation does not have expansion slots allowing for additional I/O adapter devices, a preferred implementation would search the native I/O device space for a response to an IPL code-polling sequence. Devices which would give rise to such a response may include SCSI bus, serial, and parallel devices, for example. This form of secure IPL architecture accordingly allows the standard diskless workstation to be created with minimal modifications for secure IPL thereby providing numerous benefits relating to manufacturing and distribution. However, such architecture would moreover permit costs incurred in developing such a secure IPL to be recovered only from customers requiring such a feature, e.g. when hardware is sold which includes the IPL code, encryption device, and removable key or keys, the customer would thereby be charged for the associated cost of level of security which might not be necessary for other customers.

One problem associated with standard security approaches such as a Kerberos system, is that in standard Kerberos technology a principal name is made up of two parts: the service name, and an "instance" name. The principal name 26 of the SECIPL service would accordingly be treated as a constant. There is no instance-specific component of the principal name. This further would normally be required because the client 20, as previously described, must store the whole principal name 26 of the SECIPL service 28 in ROM 42 or face possible security attacks such as those previously described. This, further, would imply that there is a single key which must be known by all instances of the SECIPL kernel server. This, in turn, would imply that all machines and administrators that are able to service SECIPL requests must be as trusted as the Kerberos server machines 24 and administrators. The same level of physical security should therefore be maintained for the SECIPL service machine or machines 28 as for the Kerberos server machine(s) 24.

In the embodiment previously described, in summary, three keys were provided. First the secret key, used once, and known only to the client and authentication server to the client and subsequently presented by the client to the SECIPL to obtain the boot image, and finally the shared key, K3, utilized for encryption or checksuming.

It will be readily apparent that as described, the service key K2, assumes a previous communication between the SECIPL and AS servers to agree on the service key, K2, to be distributed to clients. Moreover, the shared key K3, assumed such a key, perhaps created by the client, but nevertheless transmitted previously to the SECIPL server. In an alternate embodiment, a mechanism is provided to circumvent the intervention of a counterfeit server without a hardcoded name as previously described. Referring to FIG. 3, when the authentication server responds with the K2 ticket, 71, an additional step could be inserted which would cause the Kerberos server to send the K2 key to the SECIPL server (optionally encrypted with K1). The client, 20, could then validate the SECIPL server as being genuine by requesting this K2 key from the SECIPL server. The client could thereafter decrypt the K2, K3 packet received from the Kerberos server utilizing the K2 key received from the SECIPl server and thereby validate the SECIPL server by looking for an identity between the remaining K3 key and the K3 key obtained by simply decrypting with the K1 key.

While the invention has been shown and described with reference to particular embodiments thereof, it will be understood by those skilled in the art that the foregoing and other changes in form and detail may be made therein without departing from the spirit and scope of the invention.

We claim:

1. A method executed by a computer system comprised of a client and a server in a network for providing a secure operating system comprising
   storing a shared key at said client;
   communicating signals across said network comprising a request including said shared key from said client to said server interconnected by said network for activating said operating system at said client;

authenticating said request at said server;

communicating signals across said network comprising a response from said server to said client in response to said authenticated said request, said response from said server including at least a portion of said operating system;

authenticating said at least a portion of said operating system at said client with said shared key; and activating said operating system at said client in response to said response from said server.

2. The method of claim 1 wherein said authenticating said request is a precondition to said communicating said response.

3. The method of claim 1 further including the step of authenticating at said client said response from said server.

4. The method of claim 3 wherein said authenticating said response is a precondition to said activating said operating system.

5. The method of claim 1 wherein said response from said server comprises said at least a portion of said operating system encrypted prior to said communicating said response and decrypted prior to said activating said operating system.

6. The method of claim 5 wherein said operating system is decrypted and encrypted by said client and said server, respectively.

7. The method of claim 1 wherein said response further comprises a cryptographic checksum of said at least a portion of said operating system verifiable by said client.

8. A method executed by a computer system for providing a secure operating environment at a client station, comprising storing a service key at a secure boot server;

generating a request for a secure boot image from said client to a boot server;

receiving a response from said boot server by said client;

communicating a request encoded by a key known by said client and an authentication server, corresponding in part to said boot server response, by said client to said authentication server for a token for said secure boot image comprised of at least said service key and a shared key;

storing said shared key at said client;

communicating said token from said authentication server to said client in response to said request;

communicating said token from said client to said secure boot server;

verifying said token with said service key at said secure boot server;

communicating to said client from said secure boot server, in response to said verifying, at least a portion of an operating system authenticatable by said client with said shared key;

authenticating said at last a portion of said operating system by said client with said shared key; and executing by said client said at least a portion of said operating system in response to said authenticating.

9. The method of claim 8 wherein said response from said boot server includes an address of said boot server.

10. The method to claim 9 wherein said response from said boot server further includes an address of said authentication server.

11. The method of claim 10 wherein said request by said client to said authentication server includes a unique principal name of said boot server known to said client and to said authentication server and stored in non-volatile memory of said client.

12. A method executed by a computer system including at least one client workstation interconnected to a network for providing an authenticated operating system at said client workstation comprising specifying a first key, a service key, and a shared key;

transmitting onto said network a first request from said client workstation for an operating environment;

authenticating said first request received from said network with said first key;

transmitting a token corresponding to said first key, said service key and said shared key onto said network, and to said client in response to said authenticating said receiving first request;

transmitting onto said network a second request functionally related to said token from said client workstation for said operating environment;

authenticating said second request received from said network with said service key;

transmitting information at least partially encrypted with said shared key onto said network and to said client workstation in response to said authenticating said received second request;

decrypting said at least partially encrypted information at said client with said shared key; and executing said operating environment at said client workstation in response to said decrypting of said at least partially encrypted information.

13. The method of claim 12 wherein said authenticating said received first request is by an authorization server attached to said network.

14. The method of claim 13 wherein said token is transmitted from said authentication server.

15. The method of claim 13 wherein said authenticating said received second request is by a secure initial program load (SECIPL) server attached to said network.

16. The method of claim 15 wherein said at least partially encrypted information is transmitted from said SECIPL server to said client workstation.

17. The method of claim 16 wherein said at least partially encrypted information comprises at least part of an encrypted operating system decryptable by said client workstation.

18. The method of claim 16 wherein said at least partially encrypted information comprises a cryptographic checksum, decryptable by said client, of at least a part of an operating system transmitted from said SECIPL server to said client.

19. A system for providing a secure operating system for a client in a network environment, comprising authentication server means interconnected to said network for authenticating a request from said client for said operating system and providing to said client an indicator of authenticating;

secure program load server means interconnected to said network for determining said client has received said indicator and transmitting encrypted data including at least a portion of an operating system on said network to said client in response to said determining; and said network to said client in response to said determining; and client workstation means interconnected to said network for executing said secure operating system in response to unencrypting of said data by said client.

20. The system of claim 19 wherein said client workstation means includes means for transmitting said request onto said network.

21. The system of claim 20 wherein said client workstation means further includes means for receiving said indicator from said network.

22. The system of claim 21 wherein said client means further includes means for transmitting on said network to said secure program load means information in response to said client workstation means receiving said indicator, from which said determining by said secure program load means is performed.

23. The system of claim 19 wherein said encrypted data is a cryptographic checksum corresponding to said operating system.

24. A system for providing a secure operating system for a client in a network environment, comprising authentication server means interconnected to said network for authenticating a request from said client for said operating system and providing to said client an indicator of authenticating;

secure program load server means interconnected to said network for determining said client has received said indicator and transmitting at least a portion of an operating system and a cryptographic checksum of said portion of said operating system on said network to said client in response to said determining; and client workstation means interconnected to said network for executing said secure operating system in response to authenticating said portion of said operating system with said cryptographic checksum by said client.

* * * * *